United States Patent [19]

Dockery

[11] Patent Number: 4,559,136
[45] Date of Patent: Dec. 17, 1985

[54] AQUARIUM FILTERING SYSTEM

[75] Inventor: Denzel J. Dockery, Ponce De Leon, Fla.

[73] Assignee: Vortex Innerspace Products, Inc., Ponce De Leon, Fla.

[21] Appl. No.: 646,305

[22] Filed: Aug. 31, 1984

[51] Int. Cl.[4] .................. E04H 3/20; B01D 25/06
[52] U.S. Cl. ................................ 210/169; 210/235; 210/416.2; 417/360
[58] Field of Search .............. 210/169, 416.2, 234, 210/235, 233, 238, 178; 119/5; 417/360

[56] References Cited

U.S. PATENT DOCUMENTS 3,399,776  9/1968  Knuth .................... 210/234
4,267,042  5/1981  Hofmann ................. 210/169

Primary Examiner—Richard V. Fisher
Assistant Examiner—Sharon T. Cohen
Attorney, Agent, or Firm—Gifford, VanOphem Sheridan & Sprinkle

[57] ABSTRACT

The present invention provides an aquarium filtering system having a pump housing and a filter assembly which is detachably secured to the pump housing for cleaning or replacement. The pump housing includes two conduits which register with and telescopically receive two conduits on the filter assembly as the filter assembly is connected to the pump housing thus fluidly connecting the pump housing and filter assembly together. A yoke is slidably mounted to the pump housing and movable between a locking and unlocking position. In its locking position, the yoke engages two locking tabs on the filter assembly thus mechanically attaching the filter assembly to the pump housing. Conversely, in its unlocking position, the yoke enables the filter assembly to be removed from the pump housing. In addition, a valve is contained within each conduit on the pump housing and these valve automatically close upon disconnection of the filter assembly from the pump housing and prevent fluid flow through the pump housing conduits.

9 Claims, 5 Drawing Figures

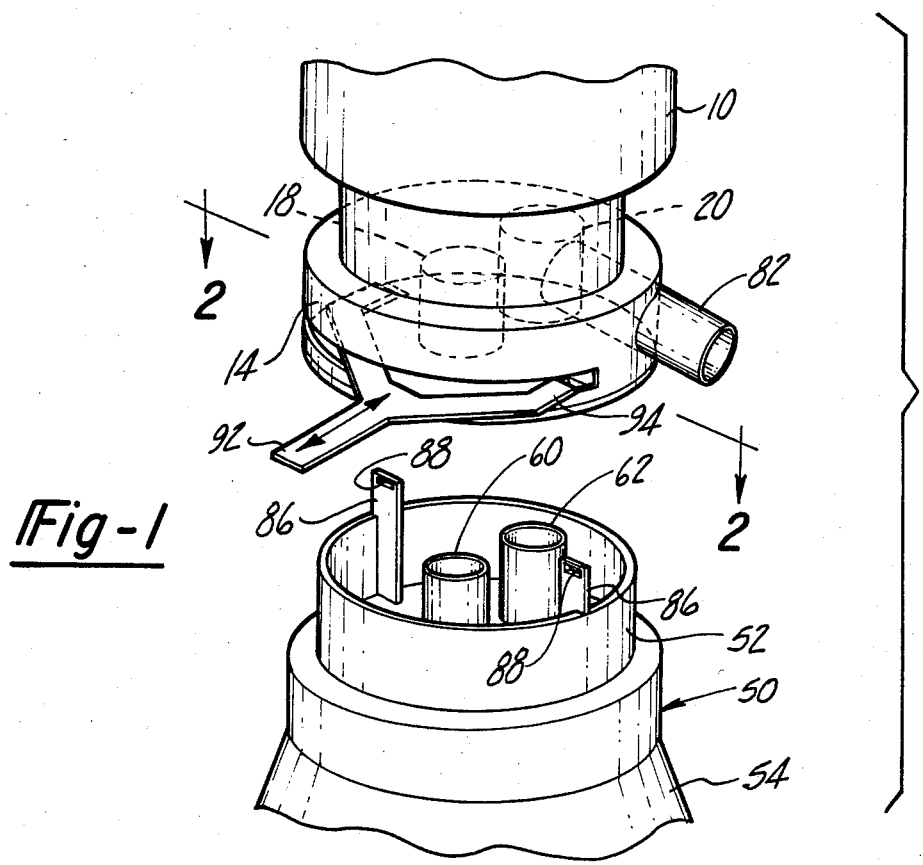
*Fig-1*
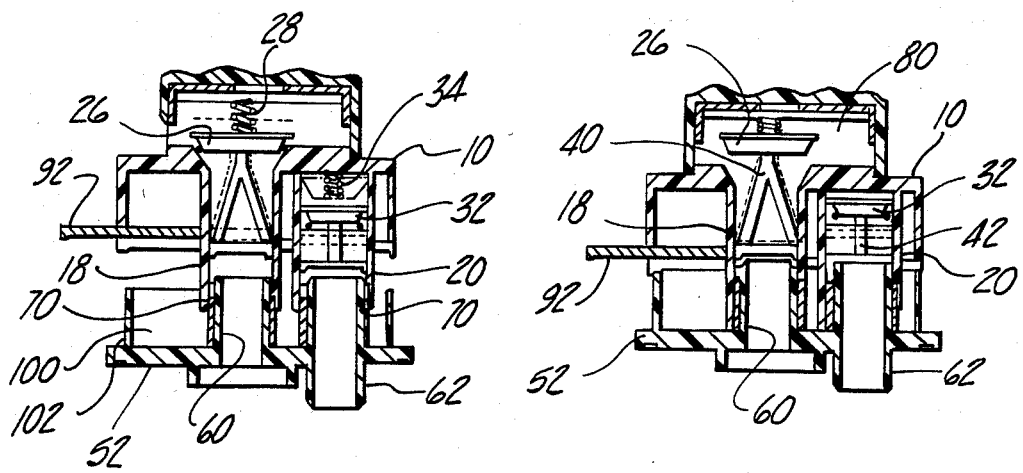
*Fig-4*  *Fig-5*

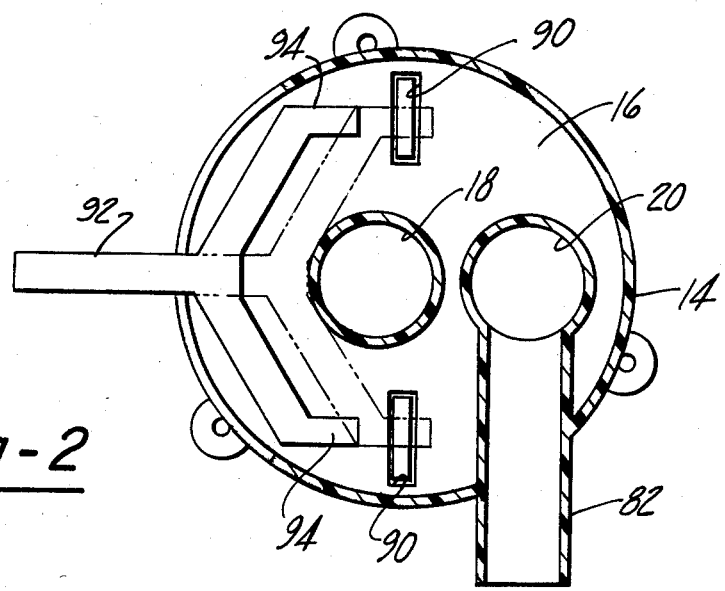
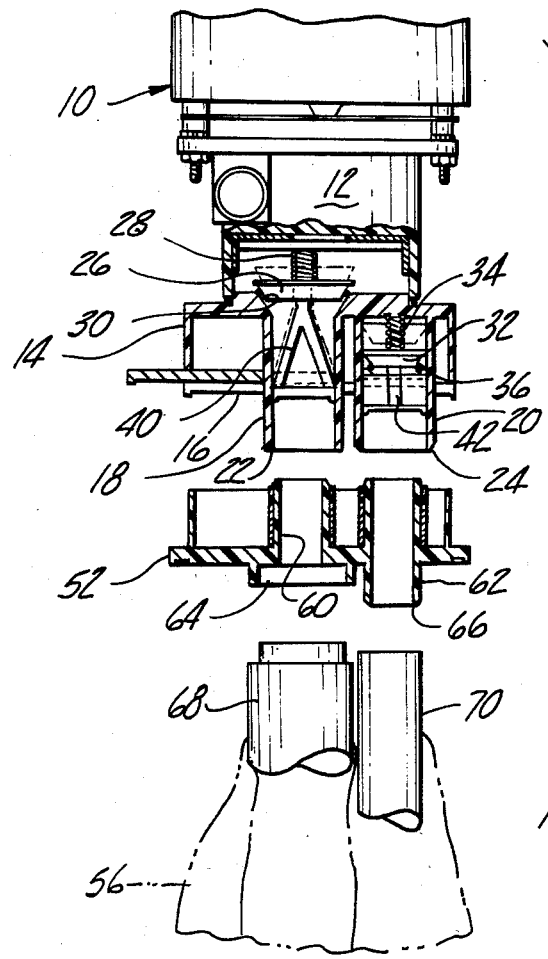

4,559,136

AQUARIUM FILTERING SYSTEM

BACKGROUND OF THE INVENTION

I. Field of the Invention

The present invention relates generally to aquarium filtering systems and, more particularly, to an aquarium filtering system having a filter assembly detachably secured to a pump housing.

II. Description of the Prior Art

There are a number of previously known aquarium filter systems which utilize a pump housing mounted to the aquarium tank and a filter assembly which is detachably secured to the pump housing. This filter assembly typically comprises a container having a bag coated with a filtering material such as diatomaceous earth, as well as an inlet port and an outlet port. Typically, the pump housing includes two ports which register with the fluid ports on the filter assembly so that, upon activation of the pump, the pump pumps water through the filter assembly.

These previously known filter assemblies typically include a threaded end which is screwed into an internally threaded portion on the pump housing in order to fluidly connect the pump housing and filter assembly together. After a period of time, the filtering material in the filtering assembly must be replaced or cleaned which necessitates the removal of the filter assembly from the pump housing. In order to do this, it is necessary to stop the pump and then unscrew the filter assembly from the pump housing.

One disadvantage of these previously known aquarium filtering systems, however, is that spillage of aquarium water occurs whenever the filter assembly is removed from the pump housing. Furthermore, with these previously known devices, once the filter assembly is removed from the pump housing, the water pump must be reprimed before operation of the filtering system can be resumed.

SUMMARY OF THE PRESENT INVENTION

The present invention provides an aquarium filtering system which overcomes all of the above mentioned disadvantages of the previously known devices.

In brief, the aquarium filtering system of the present invention comprises a pump housing having a pair of conduits which are spaced apart but parallel to each other and protrude outwardly from the pump housing. These conduits form both an outlet port and inlet port adapted for connection with the filter assembly.

The filtering system further includes a filter assembly having two conduits which form both an inlet and outlet port from the filter assembly. Preferably, the filter assembly is in the form of a cannister having a bag coated with diatomaceous earth or other filtering material. Consequently, the filter assembly removes impurities from the water as it flows from one filter port and to the other filter port.

The filter assembly is detachably mounted to the pump housing so that, upon attachment, the filter assembly conduits are telescopically received within the interior of the pump housing conduits thus fluidly connecting these conduits together and fluidly connecting the filter assembly to the pump housing. In addition, a valve is contained within each conduit on the pump housing and these valves automatically close upon disconnection of the filter assembly from the pump housing. These valves thus not only prevent leakage of water from the pump housing upon disconnection of the filter assembly but also eliminate the necessity of repriming the pump after replacement of the filter assembly.

In order to secure the filter assembly to the pump housing, the filter assembly preferably includes a pair of tabs which are slidably received through receiving slots formed in the pump housing. A yoke is slidably mounted to the pump housing between a locking and an unlocking position. In its locking position, the yoke extends through apertures formed in the tabs thereby attaching the filter assembly to the pump housing in the desired fashion.

BRIEF DESCRIPTION OF THE DRAWING

A better understanding of the present invention will be had upon reference to the following detailed description when read in conjunction with the accompanying drawing, wherein like reference characters refer to like parts throughout the several views and in which:

FIG. 1 is a fragmentary exploded elevational view illustrating a preferred embodiment of the present invention;

FIG. 2 is a cross-sectional view of a preferred embodiment of the present invention and with parts removed for clarity;

FIG. 3 is an exploded longitudinal sectional view illustrating the preferred embodiment of the present invention; and FIGS. 4 and 5 are fragmentary sectional views illustrating attachment of the filter assembly to the pump housing.

DETAILED DESCRIPTION OF A PREFERRED EMBODIMENT OF THE PRESENT INVENTION

With reference first to FIGS. 1 and 3, a preferred embodiment of a filter aquarium system is thereshown and comprises a pump housing 10 containing an electric water pump 12. The pump housing 10 is typically mounted to and fluidly connected with an aquarium tank (not shown).

Still referring to FIGS. 1 and 3, the pump housing 10 includes a generally cylindrical housing portion 14 having a lower end 16. A first conduit 18 and a second conduit 20 are integrally formed with the housing portion 14 and extend downwardly from the end 16 of the housing portion 14. Furthermore, these conduits 18 and 20 form fluid ports to the pump 12 and aquarium and are each open at their lower ends 22 and 24, respectively, and are spaced apart but parallel to each other.

Referring now particularly to FIG. 3, a valve member 26 is contained within the housing portion 14 coaxial with and adjacent the upper end of the first conduit 18. A spring 28 urges the valve member 26 against a valve seat 30 formed at the upper end of the conduit 18 and thus fluidly closing or preventing fluid flow through the conduit 18 when the valve member is in its closed position.

Similarly, a second valve member 32 is contained within the second conduit 20. A spring 34 urges the second valve member 32 against a valve seat 36 at a midpoint of the conduit 20. Consequently, with the valve member 32 in its closed position as illustrated in FIG. 3, the valve member 32 prevents fluid flow through the conduit 20.

Both valve members 26 and 32 include valve guides 40 and 42, respectively, which maintain their alignment with their respective conduits 18 and 20. Likewise, each valve seat 30 and 36 preferably includes a seal member or O-ring to enhance the fluid seal between the valve members 26 and 42 and their valve seats 30 and 36.

With reference again to FIGS. 1 and 3, the aquarium filtering system further includes a filter assembly 50 having an upper cap 52 secured in any conventional fashion to a lower jar or container 54. In the preferred form of the invention, a filter bag 56 (FIG. 3) is contained within the jar 54 and coated with diatomaceous earth or other filtering material.

A pair of tubular conduits 60 and 62 are integrally formed with the cap 52 and these conduits 60 and 62 are spaced apart and parallel to each other. In addition, as best shown in FIG. 3, the conduits 60 and 62 have their lower ends 64 and 66, respectively, fluidly secured to the filter bag 56 via 68 and turbulence tubes 70 and thus form fluid ports to the filter assembly 50. Consequently, fluid flow through the conduit 62 enters into the filter bag 56 which removes any impurities contained within the water. The filtered water then ultimately exits from the filter assembly 50 through the other conduit 60.

With reference now particularly to FIG. 4, the conduits 60 and 62 on the filter assembly 50 are dimensioned to be telescopically received within the interior of the conduits 18 and 20 on the pump housing 10. Furthermore, an O-ring or similar seal member 70 is carried on the outer periphery of each conduit 60 and 62 adjacent its upper or free end. These seal members 70 sealingly engage the interior bore of the pump housing conduits 18 and 20 upon the partial insertion of the filter assembly conduits 60 and 62 to the position shown in FIG. 4. At this time, however, the springs 28 and 34 maintain the valve members 26 and 32, respectively, in their closed position.

With reference now particularly to FIG. 5, upon the further insertion of the filter assembly conduits 60 and 62 into their respective receiving conduits 18 and 20, the conduits 60 and 62 engage the spring guides 40 and 42 thus moving the valve members 26 and 32 to their open position as shown in FIG. 5. In doing so, fluid communication is established between the conduit 60 and a pump housing chamber 80 which is fluidly connected by means not shown to the aquarium tank. Simimlarly, as the valve member 32 is moved to its open position, fluid communication is established between the filter assembly conduit 62 and a transverse conduit 82 (FIGS. 1 and 2) which is fluidly connected by means not shown to the outlet of the pump 12 thus fluidly connecting the filter assembly ports in series with the pump housing ports. Consequently, with the filter assembly 50 connected to the pump housing 10 as shown in FIG. 5, activation of the pump causes fluid flow from the pump housing 10, through the filter assembly conduit 62 and filter bag 56 (FIG. 3) and the filtered water exits from the filter assembly 50 through the conduit 60, pump housing chamber 80 and to the aquarium.

With reference particularly to FIGS. 1 and 2, in order to retain the filter assembly 50 on the pump housing 10 when in the position shown in FIG. 5, the cap 52 includes a pair of upwardly extending tabs 86 each of which has an opening 88 adjacent its upper or free end. These tabs 86 are slidably received through slots 90 (FIG. 2) formed in the bottom 16 of the housing portion 14.

With reference to FIG. 2, a bar or yoke 92 having two free legs 94 is slidably mounted to the pump housing portion 14 above its bottom 16 and slidable between a locking position, illustrated in phantom line, and a unlocking position, illustrated in solid line. The yoke legs 94 are dimensioned so that, with the filter assembly 50 in the position shown in FIG. 5, movement of the yoke 92 from its unlocking position and to its locking position forces the yoke legs 92 through the tab openings 98 thus mechanically connecting the filter assembly 50 to the pump housing 10. In order to subsequently disconnect the filter assembly 50 from the pump housing 10, it is merely necessary to move the yoke 92 to its retracted or unlocking position and then pull the filter assembly 50 downwardly and away from the pump housing.

From the foregoing, it can be seen that the present invention provides a unique aquarium filtering system in which the filter assembly 50 can be easily and rapidly connected to or disconnected from the pump housing 10. Furthermore, upon disconnection of the filter assembly 50 from the pump housing 10, the valve 26 and 32 automatically close thus eliminating the necessity to reprime the pump when a clean filter assembly 50 is subsequently reattached to the pump housing 10. Furthermore, upon reconnection of the filter assembly 50 to the pump housing 10, the valves 26 and 32 are automatically opened thus re-establishing the fluid connection between the aquarium pump 12 and the filter assembly 50.

A still further advantage of the aquarium filtering system of the present invention is that the seal members 70 sealingly engage the inner periphery of the pump housing conduits 18 and 20 upon partial insertion of the fluid assembly conduits 60 and 62 into their receiving pump housing conduits 18 and 20. This construction thus minimizes water leakage during the initial connection of the filter assembly 50 to the pump housing 10. Any small water leakage which may occur during the connection or disconnection of the filter assembly 50 to or from the pump housing 10 is entrapped within a chamber 100 (FIG. 4) formed by an outer ring 102 on the filter assembly cap 52.

Having described my invention, however, many modification thereto will become apparent to those skilled in the art to which it pertains without deviation from the spirit of the invention as defined by the scope of the appended claims.

I claim:

1. An aquarium filtering system comprising:
a pump housing having means forming two fluid ports,
a filter assembly having means forming two fluid ports,
means contained in said filter assembly for filtering water flow from one filter assembly port and to the other filter assembly port,
means for detachably connecting said filter assembly to said pump housing so that, upon connection, said filter assembly ports are fluidly connected in series with said pump housing ports, and
means for automatically fluidly closing said pump housing ports upon disconnection of said filter assembly from said pump housing;
wherein said pump port closing means comprises a valve member disposed in and adapted to fluidly seal each pump port; said member being abuttable with the corresponding filter assembly port, so as to unseal said pump port upon such abutment.

2. The invention as defined in claim 1 wherein said pump housing comprises a pair of first tubular conduits which form said housing ports, said conduits being substantially parallel to and spaced apart from each other, and wherein said filter assembly comprises a pair of second tubular conduits which form said filter assembly ports, said second conduits being spaced apart and substantially parallel to each other, and wherein upon connection to said filter assembly to said pump housing one pair of said conduits is telescopically received within the other pair of said conduits.

3. The invention as defined in claim 2 and comprising a fluid seal carried around an outer periphery of each of said one pair of said conduits, said fluid seals sealingly engaging an interior surface of said other pair of conduits upon partial insertion of said one pair of conduits into said other pair of conduits.

4. The invention as defined in claim 2 wherein said fluid closing means comprises a normally closed valve contained within the interior of each first conduit and means on said filter assembly for moving said valves to said open position upon connection of said filter assembly to said pump housing.

5. The invention as defined in claim 4 wherein said moving means comprises said second conduits.

6. The invention as defined in claim 1 wherein said filter assembly comprises at least one outwardly extending tab, said tab being slidably received in an opening in said pump housing as said filter assembly is connected to said pump housing, wherein said connecting means comprises a bar slidably mounted to said pump housing between a locking and an unlocking position, and wherein in said locking position said bar extends through an aperture in said tab.

7. The invention as defined in claim 1 wherein said filter assembly comprises two spaced and outwardly extending tabs, said tabs being slidably received in two openings in said pump housing as said filter assembly is connected to said pump housing, wherein said connecting means comprises a yoke having two legs and slidably mounted to said pump housing between a locking and an unlocking position, and wherein in said locking position one said yoke leg extends through an aperture in each tab.

8. An aquarium filtering system comprising:
   a pump housing having means forming two fluid ports;
   a filter assembly having means forming two fluid ports;
   means contained in said filter assembly for filtering water flow from one filter assembly port and to the other filter assembly port;
   means for detachably connecting said filter assembly to said pump housing so that, upon connection, said filter assembly ports are fluidly connected in series with said pump housing ports, and
   means for automatically fluidly closing said pump housing ports upon disconnection of said filter assembly from said pump housing;
   wherein said filter assembly comprises at least one outwardly extending tab, said tab being slidably received in an opening in said pump housing as said filter assembly is connected to said pump housing, wherein said connecting means comprises a bar slidably mounted to said pump housing between a locking and an unlocking position, and wherein in said locking position said bar extends through an aperture in said tab.

9. The invention as defined in claim 8, wherein said filter assembly comprises two spaced and outwardly extending tabs, said tabs being slidably received in two openings in said pump housing as said filter assembly is connected to said pump housing, wherein said connecting means comprises a yoke having two legs and slidably mounted to said pump housing between a locking and unlocking position, and wherein in said locking position one said yoke leg extends through an aperture in each tab.

* * * * *